United States Patent [19]

O'Keefe

[11] Patent Number: 5,228,903

[45] Date of Patent: Jul. 20, 1993

[54] METHOD FOR STRIPPING METALS IN SOLVENT EXTRACTION

[75] Inventor: Thomas J. O'Keefe, Rolla, Mo.

[73] Assignee: The Curators of the University of Missouri of Columbia, Columbia, Mo.

[21] Appl. No.: 728,209

[22] Filed: Jul. 10, 1991

Related U.S. Application Data

[63] Continuation-in-part of Ser. No. 510,684, Apr. 18, 1990, abandoned.

[51] Int. Cl.$^5$ .............................................. C22B 15/00
[52] U.S. Cl. ...................................... 75/743; 75/721; 75/722; 75/724
[58] Field of Search .................. 75/743, 721, 722, 724

[56] References Cited

U.S. PATENT DOCUMENTS

| | | | |
|---|---|---|---|
| 2,877,250 | 3/1959 | Brown | 75/721 |
| 4,378,275 | 3/1983 | Adamson | 75/724 |
| 5,039,496 | 8/1991 | Kehl | 75/722 |
| 5,101,066 | 3/1992 | Shanzer | 75/722 |

Primary Examiner—Peter D. Rosenberg
Attorney, Agent, or Firm—Wenderoth, Lind & Ponack

[57] ABSTRACT

Aqueous solutions containing metal cations, that may include cations of both desired metal and impurity or secondary metal, are treated with an organic liquid extractant suitable for the extraction of cations of the desired metal, cations of at least one secondary metal being co-extracted. After phase disengagement, the loaded organic phase containing cations of either a desired metal or desired metal together with at least one secondary metal is contacted with a solid metal or solid metal alloy capable of reducing in the organic phase cations of either a desired metal or a secondary metal from a higher to a lower state of oxidation. Depending on the extracted metal(s) and the added solid metal or alloy, cations of the at least one extracted metal are reduced to the lower state of oxidation and either are deposited (cemented) in the metallic state onto the solid metal or alloy, or are partially reduced in the organic phase to a lower oxidation state with the solid metal or alloy being oxidized in part. The method of galvanic stripping is carried out at ambient pressures and at ambient or slightly elevated temperatures.

29 Claims, No Drawings

METHOD FOR STRIPPING METALS IN SOLVENT EXTRACTION

This is a continuation-in-part of U.S. application Ser. No. 07/510,684, filed Apr. 18, 1990, now abandoned.

This invention relates to the solvent extraction of metals and, more particularly, to a method for the removal of metal cation species in solvent extraction by galvanic stripping with added metals.

BACKGROUND OF THE INVENTION

Aqueous solutions that contain one or more dissolved metals in ionic form may be subjected to solvent extraction for the recovery of one or more desired metals. The desired metal ions are usually extracted from aqueous solution into an organic solvent containing an extractant and are recovered from the loaded solvent by stripping with a suitable aqueous strip solution. The other metals, present as ions in the aqueous solution as impurities, must often be removed from the process as they may cause difficulties in the stripping of the desired metal, and often increase in concentration in the circulating solvent to an extent that affects the efficiency of the extraction process.

Methods that are used alone and in combinations for removing desired and impurity cations present in solvent extraction processes include the conventional stripping or selective stripping with acidic or basic solutions and the more recently developed hydrogen reductive stripping, hydrolytic stripping and electrolytic stripping.

Stripping is often accomplished with acids or bases under ambient or elevated conditions. Hydrogen reductive stripping is carried out at temperatures between 150° and 350° C. under elevated pressure and usually in the presence of seed metal particles to produce a metal powder. In hydrolytic stripping, loaded solvent is subjected to elevated temperatures (100°–250° C.) in the presence of water whereby metal oxides or hydroxides are formed. Hydrogen reductive stripping and hydrolytic stripping have been reviewed by Monhemius, A. J., Mintek 50, pp. 599–609. Electrolytic stripping has been applied to a loaded solvent by subjecting the solvent to electrolysis with electrodes placed in the loaded solvent (Wan, R. Y., et al., J. of Metals, Dec. 1986, pp. 35–40).

Ferric iron may also be stripped from various loaded organic solvents into the aqueous phase with an acid alone or combined with the introduction of sulfur dioxide or hydrogen sulfide to reduce ferric to ferrous. The stripping may be carried out at ambient or elevated temperatures and pressures. It is noted that iron is usually present in solvent extraction processes as ferric and that, in many cases, ferrous is the stable form in the aqueous phase.

The above prior art methods have a number of disadvantages. In conventional stripping, high concentrations of the strip solution are often required. Where lower concentrations are used, the processes are complicated by, for example, the use of combinations of extractants. Hydrogen precipitation and gaseous and/or hydrolytic stripping, especially under elevated pressure and at higher temperatures, are expensive and complex.

In aqueous hydrometallurgical processes use is often made of galvanic reactions between metals that cause reduction of a metal cation and precipitation, i.e. cementation, onto an added solid metal. This has not been applied to solvent extraction processes. Any methods disclosed for the reduction of metal cations to reduce and cement metal cations onto an added solid metal have been applied before carrying out the solvent extraction. According to Canadian Patent 1 250 210, a solution containing iron and zinc is treated in two stages with metallic iron and zinc to reduce ferric to ferrous iron and cementation of copper, arsenic, antimony and bismuth on the iron, followed by precipitation of a sludge of tin, cadmium and lead in the second stage treatment with zinc dust. After this two-stage pre-treatment in an aqueous system, zinc chloride is extracted with an organic liquid. The reduction stages are, therefore, essentially separate from the solvent extraction process. It is noted that no metal is actually deposited onto the zinc powder in the second stage.

Shibata Junji et al. reported that ferric iron can be stripped from di-2-ethyl-hexylphosphoric acid (D2EHPA) with mineral acid and iron powder (Proc. Symp. Solvent Extr. 1986, 139–142). Shibata et al. only disclose the stripping of ferric iron from D2EHPA with iron powder. Shibata et al. do not disclose the galvanic stripping with metals other than iron, or the deposition of metals onto added metals, or stripping of metals other than iron from organics other than D2EHPA.

Taking the above-mentioned teachings according to the Canadian Patent and Shibata et al., one could not presume a priori that the Shibata et al. method is operable with zinc powder or metals other than iron and zinc. Similarly, it could not be presumed that the Shibata et al. method is operable with organics other than D2EHPA, or that actual deposition of a metal species dissolved in an organic liquid would occur in the organic phase onto an added solid metal. It could also not be presumed that addition of a solid metal to an organic phase would make it possible to reduce metal ions other than ferric ions in the organic phase from a higher to a lower state of oxidation.

SUMMARY OF THE INVENTION

The present invention seeks to provide an excellent and simple way to separate a wanted cation species from another one in an organic liquid, the species being either a desired or an undesired species. Thus, it has been found that many metal cations can be readily reduced in a loaded organic liquid by contacting loaded organic liquid with a suitable solid metal or solid metal alloy causing a galvanic reaction. More particularly, aqueous solutions containing metal cations, that may include cations of both desired metal and impurity or secondary metal, are treated with an organic liquid extractant or solvent suitable for the extraction of cations of the desired metal, cations of at least one secondary metal being co-extracted. After phase disengagement, the loaded organic phase containing either cations of a desired metal or cations of desired metal together with cations of secondary metal is contacted with a solid metal or solid metal alloy capable of reducing in the organic phase either cations of a desired metal or cations of a secondary metal from a higher to a lower state of oxidation. Depending on the extracted metal(s) and the added solid metal or solid metal alloy, the cations of an extracted metal are reduced to the lower state of oxidation and are either deposited (cemented) in the metallic state onto the solid metal or solid metal alloy, or are partially reduced in the organic phase to a lower oxidation state, which is easily stripped, with the solid metal or solid metal alloy being oxidized in part. The method of galvanic stripping is carried out at ambient pressures and at ambient or slightly elevated temperatures. It is understood that the term solid metal will be used hereinafter to denote and is hereby defined to include both solid metals and solid metal alloys.

Galvanic stripping is useful for the removal of cations of a desired metal, or cations of a secondary metal, from an organic liquid into which it has been extracted from an aqueous solution. Cations of a desired metal or cations of a secondary metal may be galvanically stripped from an organic liquid by deposition of such a metal onto an added solid metal capable of reducing cations of such a metal to its metallic state, and removing the added solid metal with deposited metal from the organic liquid. Galvanic stripping is also useful for the partial reduction to a lower state of oxidation and for the removal of cations of secondary metals from an organic liquid. By adding a suitable solid metal, cations of the secondary metal are reduced to a lower state of oxidation and are removed by stripping into an aqueous phase. Reduction and stripping may be carried out selectively and separately in two steps or simultaneously in one step. Where the organic phase contains cations of both a desired metal and a secondary metal, and cations of the secondary metal are only partially reduced to a lower state of oxidation, the stripping of cations of the desired metal may be carried out either before or after the contacting with solid metal and the removal of cations of the reduced secondary metal from the organic phase. The solid metal is preferably used in particulate form. The use of a solid metal reductant makes it possible to directly reduce cations of a metal, especially cations of those metals that may be difficult to transfer from the organic phase in their normal oxidation state, into the solid state or in a partially reduced form (but usually still in cationic form) to allow easy stripping. The method according to the invention eliminates the use of high temperatures and/or pressures, and the need to deal with stripping solutions that are not easily treated, or are chemically or environmentally undesirable.

Accordingly, it is an aspect of the present invention to provide a method for the galvanic stripping of metal ions from loaded organic liquids.

It is another aspect to provide a method for the solvent extraction of cations of metals wherein a loaded organic liquid is treated with solid metal reductant, which may be a single metal or an alloy.

It is still another aspect to provide a method for the solvent extraction of cations of metals wherein cations of an extracted metal are precipitated onto a solid metal reductant.

It is yet another aspect to provide a method for the solvent extraction of cations of metals wherein cations of an extracted metal are at least partly reduced.

It is yet a further aspect to provide a method for the solvent extraction of cations of metals wherein cations of a metal are simultaneously at least partly reduced in and stripped from the organic phase.

These and other aspects of the method according to the invention will become clear from the following detailed description.

According to the main embodiment of the invention, there is provided a method for the extraction of cations of at least one metal from an aqueous solution with an organic liquid capable of extracting cations of said at least one metal in a higher state of oxidation from said solution, said aqueous solution containing cations of metals chosen from the group consisting of a) cations of a desired metal and b) cations of a desired metal together with cations of at least one secondary metal, cations of said at least one secondary metal being co-extracted from the aqueous solution by the organic liquid, said method comprising the steps of: (1) mixing said aqueous solution with said organic liquid for the formation of an aqueous raffinate phase and an organic phase containing cations of said at least one metal; (2) separating said aqueous raffinate phase from said organic phase; (3) contacting separated organic phase with a solid metal capable of reducing in said organic phase at least a portion of said cations of metals from said higher state of oxidation into a lower state of oxidation, said solid metal being chosen from the group consisting of Zn, Al, Cu, Cd, Mn, Mg, Fe, and their alloys, to provide organic liquid having a reduced content of said cations of metals; (4) removing said organic liquid having a reduced content of said cations of metals from said solid metal; and (5) returning organic liquid having a reduced content of said cations of metals to said mixing of step (1); wherein solid metal is defined as including both solid metals and solid metal alloys.

According to a first preferred embodiment, there is provided a method according to the main embodiment wherein said cations of metals comprise both cations of a desired metal and cations of at least one secondary metal, cations of said desired metal and cations of said at least one secondary metal are extracted into said organic phase, cations of said desired metal are stripped from separated organic phase with a stripping solution capable of stripping cations of said desired metal from separated organic phase prior to said contacting with solid metal while substantially leaving cations of said at least one secondary metal in said organic phase, and cations of said at least one secondary metal are reduced to said lower state of oxidation in said contacting.

According to a second preferred embodiment, there is provided a method according to the main embodiment, wherein said cations of metals comprise cations of a desired metal and cations of at least one secondary metal, cations of said desired metal and cations of said at least one secondary metal are extracted into said organic phase, cations of said at least one secondary metal are reduced to a lower state of oxidation in said contacting while substantially leaving cations of said desired metal in said organic phase to provide organic liquid having a reduced content of cations of secondary metal and having left cations of the desired metal therein, and stripping cations of said desired metal from said organic liquid having a reduced content of cations of secondary metal with a stripping solution capable of stripping cations of said desired metal from said organic liquid prior to returning liquid having a reduced content of cations of secondary metal to said mixing of step (1).

According to a third preferred embodiment there is provided a method according to the main embodiment, wherein cations of metal comprise cations of a desired metal, and wherein cations of said desired metal are reduced to said lower state of oxidation and are deposited onto said solid metal, and said solid metal with deposited desired metal is removed from said organic liquid.

DETAILED DESCRIPTION

Solvent extraction or liquid-liquid extraction is a versatile method for the selective separation of metals. The separation involves the mass transfer of metal cations across boundary interfaces between two contacting, insoluble phases, i.e. an organic phase and an aqueous phase.

The degree of extraction is influenced by the selectivity among various cations in the solution and the pH. In many cases, the process functions very well using straight-forward, reversible loading and stripping. In other cases reactions are less easily attained by simple shifts in chemical equilibria, and it is in these cases that the galvanic stripping method of the present invention finds particular application. Although the method of the present invention is applicable in many instances as an alternative to or even preferable over hydrogen reduction, or gaseous or hydrolytic stripping, the galvanic stripping of this invention is particularly valuable for the recovery of certain desired cations and for the removal of co-extracted cations of impurity, unwanted or secondary metals, especially iron.

In the galvanic stripping according to the invention, an added solid metal reductant provides an electrochemical driving force to alter the oxidation state or, in general, modify the equilibrium of inorganic ions dissolved in organic liquids. These alterations are important because certain separations or recoveries, that are not normally attainable using a standard chemical driving force or technique, become possible using electrochemical reactions. The following simplified equations represent two possible reactions:

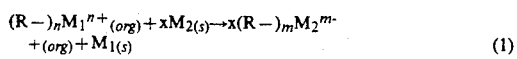

$$(R-)_n M_1^{n+}{}_{(org)} + xM_{2(s)} \rightarrow x(R-)_m M_2^{m+}{}_{(org)} + M_{1(s)} \quad (1)$$

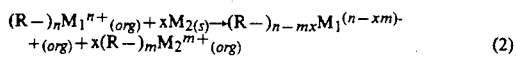

$$(R-)_n M_1^{n+}{}_{(org)} + xM_{2(s)} \rightarrow (R-)_{n-mx} M_1^{(n-xm)+}{}_{(org)} + x(R-)_m M_2^{m+}{}_{(org)} \quad (2)$$

wherein $(R-)$ is the organic and $M_1$ and $M_2$ are different metals or their complexes in the organic phase. Equation (1) shows the reduction of the $M_1$ ion to metal $M_{1(s)}$ by added solid metal $M_{2(s)}$. This reduction is similar to but by no means the same as the displacement (or cementation) reactions commonly encountered in aqueous chemical processes. In equation (2), the $M_1$ ion is only partially reduced by solid metal $M_{2(s)}$ to a lower oxidation state, altering the equilibrium and allowing easier stripping into an aqueous phase. In both cases, $M_2$ remains in the organic phase as an oxidized stable species. The suitability of $M_2$ as a reactant for $M_1$ in such a system then requires that a) added solid metal $M_2$ is capable of forming a stable $R-M_2$ species, and b) the potential of the half cell $M_2/R-M_2$ is less noble than that of $M_1/R-M_1$. These conditions are necessary, but not necessarily sufficient, to insure reaction. As is often the case for similar reactions occurring in an aqueous solution, the magnitude of the differences in potentials as well as the reaction kinetics must be considered. Generally, the added solid metal must be capable of reducing a metal extracted into an organic liquid to a lower state of oxidation.

The method is carried out using the conventional process steps in solvent extraction. Aqueous solution containing one or more dissolved metal species, in the form of cations or, in some cases, complexed as anions, is mixed with an amount of an organic liquid capable of extracting cations or complexed anions of a desired metal. The organic liquid is usually premixed with a diluant, a modifier may be added, and the organic liquid may be equilibrated or conditioned prior to mixing with aqueous solution. Aqueous solution and organic liquid are mixed to form a loaded organic raffinate phase and an aqueous phase, which are subsequently separated. If desired, the loaded organic phase may be scrubbed with a scrub solution. Conventionally, a scrub raffinate is separated and loaded (scrubbed) organic phase is stripped with a strip solution to form a strip liquor and a stripped organic liquid. Cations of the desired metal are recovered from the separated strip liquor and the stripped organic liquid is regenerated, purified and recycled to the extraction.

To strip cations of a metal galvanically, whether cations of a desired metal or cations of a secondary metal, from loaded organic phase, an amount of suitable solid metal is added to the loaded organic phase, after separation from the aqueous raffinate phase. The suitable solid metal must be capable of reducing cations of the metal to a lower oxidation state, either to its elemental form, i.e. the metallic state, or to a partly lowered oxidation state. The amount of added solid metal should be at least stoichiometric to accomplish the reactions, but is added preferably in excess of the stoichiometrical amount required to effect the reduction.

The solid metal may be added in the form of sheets or coupons but is preferably added in a particulate form such as chips, pellets, granules or powders. Although coarse reductant effects the reduction, small particle sizes increase the rate and efficiency considerably. A broad range of particle sizes may be used, such as in the range of from about 44 to 6000 microns. The particle sizes are preferably in the range of from about 44 to 600 microns. The reduction may be carried out in an oxidizing, neutral or reducing atmosphere to suit the needs of the desired reaction. The reduction is preferably carried out in the absence of oxygen, as, in the case of some metals, oxygen (air) tends to re-oxidize cations of the reduced metal and to lower the efficiency. If desired, the reduction may be carried out in the presence of nitrogen, which is essential in some cases to avoid re-oxidation.

The galvanic stripping is carried out at ambient pressures and at ambient temperatures. As the reduction is temperature dependent, the rate of reduction may be increased by using elevated temperatures. Preferably, slightly elevated temperatures such as, for example, up to about 60° C. may be used. The temperature may, therefore, be in the range of from ambient to about 60° C. Efficiency is increased with good mixing during the contacting and stripping steps.

The loaded organic phase is contacted with the solid metal for a period of time sufficient to reduce at least a portion of cations of the metal in the organic phase. Contact times may be in the range from about 1 to 90 minutes, preferably about 15 to 60 minutes. The contacting may be carried out continuously or intermittently in a column loaded with reductant by passing the loaded organic phase through the column. Alternatively, the contacting may be carried out by mixing reductant with the loaded organic phase in a suitable vessel provided with agitation.

In the galvanic stripping with a suitable solid metal, whereby cations of the metal extracted into an organic liquid are reduced to the metallic state and deposited onto the added solid metal, cations of certain metals (extracted as cations of desired metal or cations of secondary metal) can be deposited onto suitably selected added solid metals from certain solvents. Cations of more than one secondary metal may be co-extracted, and cations of at least one of the co-extracted secondary metals may be reduced to a lower state of oxidation and deposited in the metallic state onto the solid metal. The reduction and deposition are also dependent on the type of anion originating from the aqueous feed solution fed to the solvent extraction process. The following Table I lists extracted metal cations that were extracted from aqueous feed solution with a suitable organic liquid, and were reduced to elemental form in the organic phase from either a sulfate, chloride or cyanide anion system by solid metals.

TABLE I

| Organic Liquid | Anion | Extracted Cation | Solid Metal |
|---|---|---|---|
| D2EHPA | sulfate | Cu2+ | Zn,Cd,iron |
| | sulfate | Ag+ | Al,Zn,Cu |
| | sulfate | Co2+ | Zn*,Mn* |
| | chloride | Sn4+ | Zn* |
| | chloride | Pb2+ | Zn |
| Aliquat $_{TM}$ 336 | sulfate | Cu2+ | Zn,Al,Cd |
| | chloride | Cu2+ | Zn,Al,Cd |
| | sulfate | Ni2+ | Zn*,iron* |
| | cyanide | Au3+ | Zn |
| LIX $_{TM}$ 622 | chloride | Cu2+ | Zn |
| LIX $_{TM}$ 864 | chloride | Cu2+ | Zn,iron |

*Nitrogen must be present wherein D2EHPA is di-2-ethylhexylphosphoric acid, Aliquat $_{TM}$ 336 is tri-($C_8C_{10}$) methylammonium chloride, LIX $_{TM}$ 622 is a mixture of LIX $_{TM}$ 860 (5-dodecylsalicylaldoxime) with tridecanol, LIX $_{TM}$ 864 is a mixture of LIX $_{TM}$ 64N, which is 1 vol % LIX $_{TM}$ 63 (5, 8-diethyl-7-hydroxy-6-dodecanone oxime) in LIX $_{TM}$ 65N (2-hydroxyl-5-nonylbenzophenone oxime) and LIX $_{TM}$ 860, and iron denotes low carbon steel or electrolytic iron.

As, unfortunately, the majority of common organic extractants also remove undesirable cations, i.e. cations of secondary metals, from an aqueous solution in addition to the cations of the desired metal, the present method is also useful to remove cations of such secondary metals from the organic phase For example, a reaction that may occur in the loading of the extractant with iron as secondary metal in the form of ferric ions from a sulfate solution may be represented by the following equation:

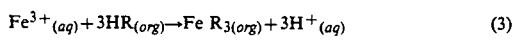
$$Fe^{3+}{}_{(aq)} + 3HR_{(org)} \rightarrow Fe\,R_{3(org)} + 3H^+{}_{(aq)} \qquad (3)$$

The extraction from a chloride solution, using a tertiary amine, may be represented by the equation:

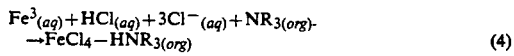
$$Fe^3{}_{(aq)} + HCl_{(aq)} + 3Cl^-{}_{(aq)} + NR_{3(org)} \rightarrow FeCl_4 - HNR_{3(org)} \qquad (4)$$

Thus, when aqueous solution containing cations of desired metal and cations of iron as secondary metal is contacted with an organic liquid extractant, the resulting organic phase contains, in addition to cations of the desired metal, the above-noted ferric complexes which are strongly stable After separation of the loaded organic phase from the aqueous raffinate phase, the loaded organic phase is contacted with a suitable solid metal that is capable of reducing the ferric to the ferrous form Suitable solid metals are selected from the group consisting of zinc, manganese and magnesium, the use of zinc being preferred. Certain alloys, such as, for example, low carbon steel or zinc containing a small amount of lead (e.g. 0.2%) may also be used Small amounts of certain alloying metals favorably affect the reactivity of the so activated zinc. The use of activated zinc is most preferred. Cations of the desired metal may be stripped from the organic phase with a stripping solution capable of stripping cations of the desired metal from the organic phase, either before or after the contacting with solid metal, and removing cations of the secondary metal in its partially reduced state of oxidation.

For example, the galvanic stripping reactions of iron with the preferred solid metal, i.e. activated zinc, may be represented by the equations (5), and (6) and (7):

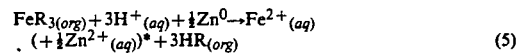
$$FeR_{3(org)} + 3H^+{}_{(aq)} + \tfrac{3}{2}Zn^0 \rightarrow Fe^{2+}{}_{(aq)} \\ (+\tfrac{3}{2}Zn^{2+}{}_{(aq)})^* + 3HR_{(org)} \qquad (5)$$

and

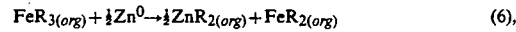
$$FeR_{3(org)} + \tfrac{3}{2}Zn^0 \rightarrow \tfrac{3}{2}ZnR_{2(org)} + FeR_{2(org)} \qquad (6),$$

the organic complexes reacting with hydrogen ions (acid) as follows

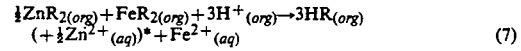
$$\tfrac{3}{2}ZnR_{2(org)} + FeR_{2(org)} + 3H^+{}_{(org)} \rightarrow 3HR_{(org)} \\ (+\tfrac{3}{2}Zn^{2+}{}_{(aq)})^* + Fe^{2+}{}_{(aq)} \qquad (7)$$

*Zinc may remain in the organic phase if solution is dilute.

Equation (5) illustrates the reduction and stripping being accomplished simultaneously in one step, and equations (6) and (7) sequentially in two separate steps.

The contacting may be carried out as described above and with similar conditions of time, temperature, pressure and particle sizes to reduce at least a portion of cations of the secondary metal in the organic phase from a higher to a partially reduced lower state of oxidation, i.e. ferric to ferrous ion. The organic liquid may be one of a number of extractants into which iron is co-extracted such as, for example, phosphoric acids such as di-2-ethylhexylphosphoric acid (D2EHPA), mono-2-ethylhexylphosphoric acid (M2EHPA) and mixtures thereof, phosphonics such as the mono-2-ethylhexyl ester of 2-ethylhexylphosphonic acid (PC88A, tradename), phosphinics such as bis (2,4,4-trimethylpentyl) phosphinic acid (Cyanex $_{TM}$ 272), and (LIX 64N) which is a mixture of LIX 65N (2-hydroxy-5-nonylbenzophenone oxime) and 1% LIX 63 (5, 8 -diethyl-7-hydroxy-6-dodecanone oxime).

In the two steps of first reducing ferric to ferrous and then stripping the ferrous, the loaded organic phase is contacted with particulate zinc under the appropriate conditions, as described. After contacting, the solution is stripped with an acid such as sulfuric or hydrochloric acid. For example, the strength of the acid may range from 20 to 100 g/L $H_2SO_4$ or 30 to 100 g/L HCl, dependent on the organic. For example, the reduction of ferric in the loaded organic phase with zinc powder then allows stripping with a sulfuric acid solution at a value of the pH of about 3. At this pH value the zinc remains in the organic phase, providing a selective separation from the iron. At a pH below about 3.5, no iron or zinc hydroxides precipitate. Using HCl as stripping acid, the pH should also have a value of below about 3.5.

In the one-step galvanic stripping, zinc metal and acid stripping solution are both added to the loaded organic phase. After the desired contact time under the desired conditions, as described, the phases are separated, the ferrous iron reporting to the aqueous phase. If desired, using the appropriate conditions, a portion or virtually all of the iron can be removed from the organic phase using either the one-step or the two-step method. It is noted that the reduction substantially takes place in the organic phase, as ferric ions do not readily strip into the aqueous phase.

According to the embodiment wherein an aqueous solution contains cations of a desired metal together with cations of a secondary metal, the method is carried out as follows. The aqueous solution is mixed with an organic liquid capable of extracting cations of the desired metal and co-extracting cations of the secondary metal to form an aqueous phase and a loaded organic phase containing both cations of the desired metal and cations of the secondary metal. The secondary metal is substantially present in a higher oxidation state. The loaded organic phase is separated from the aqueous raffinate phase. Cations of the desired metal are then stripped, if desired after scrubbing, from the loaded organic phase with a stripping solution capable of stripping cations of the desired metal from the organic phase while substantially leaving cations of the secondary metal in the higher oxidation state in the organic phase. The organic liquid is subsequently contacted, batchwise, continuously or intermittently, with a solid metal for the reduction of at least a portion of cations of the secondary metal from the higher state of oxidation to a partially reduced state of oxidation. Cations of the secondary metal in the partially reduced state of oxidation are stripped from the organic liquid with a stripping solution capable of stripping cations of partially reduced secondary metal from the organic liquid with the formation of a regenerated organic liquid having a reduced content of cations of the secondary metal. The regenerated organic liquid is returned to the extraction step. Alternatively, cations of the secondary metal in the higher state of oxidation in the separated loaded organic phase are first partially reduced and stripped from the organic liquid without substantially reducing or stripping cations of the desired metal in the organic, and cations of the desired metal are then stripped from the organic phase, leaving a regenerated organic liquid with a reduced content of cations of secondary metal for return to the mixing step for extraction of metal.

This embodiment may, for example, be applied to a solution containing indium as desired metal and iron as secondary metal, and using commercial grade di-2-ethylhexylphosphoric acid, which contains mono-2-ethylhexylphosphoric acid, dissolved in kerosene. Cations of both metals are substantially extracted into the organic liquid. The indium is stripped from the loaded organic phase with dilute hydrochloric acid (1-3 normal) substantially leaving the iron in the organic phase. The organic phase is then contacted, as described, with zinc having particle sizes from about 44 to 6000 microns, preferably about 74 to 150 microns, in the presence of nitrogen and at temperatures of from ambient to about 60° C. After allowing adequate contact time and a following solids-liquid separation, the ferrous iron is stripped from the organic phase with a sulfuric acid stripping solution containing 20 to 100 g/L sulfuric acid. The organic liquid with a reduced iron content is returned to the extraction. As explained above, the reduction and the stripping of ferrous iron may be carried out simultaneously in one step or separately in two steps.

Although the partial reduction of a metal cation to a lower state of oxidation has been described mostly with reference to iron, this embodiment may also be used for the partial reduction of other multivalent metal cations such as Ce, Mn and Cr. The method of the invention may be used in a number of applications. The method is suitable for the selective removal of cations of a metal from an aqueous solution by solvent extraction, the metal cation being of a desired metal or of a secondary metal; for the removal of cations of a metal from an organic liquid that is difficult to remove in its normally occurring oxidation state; for the removal of cations of one or more co-extracted secondary metals from an organic liquid being used for the recovery of a desired metal; or for the coating of a metal on the added solid metal as a substrate. In these and modified embodiments, solvent-solid metal combinations especially designed to effect such applications may be used.

The invention will now be illustrated by the following non-limitative examples.

EXAMPLE 1

This example illustrates that the galvanic stripping of certain metal cations from certain organic liquids can be carried out with suitably selected solid metals. In a number of tests, an organic liquid was loaded with a metal cation extracted from an aqueous solution containing cations of the metal. The loaded organic phase was contacted with an excess of solid metal in particulate form for 30 minutes. Some tests were carried out in the presence of nitrogen. The solid metal was removed from the organic liquid. Examination of the removed solid metal with a scanning electron microscope showed that cations of the metal had been deposited on the surface of the added solid metal, the cations of the metal having been reduced to the metallic state. The cations of the metal extracted from aqueous solutions, the organic liquids, the anion of the aqueous system and the added solid metal are tabulated in Table II.

TABLE II

| Organic Liquid*** | Anion | Extracted Cation | Solid Metal |
|---|---|---|---|
| D2EHPA | sulfate | $Cu^{2+}$ | Zn,Cd,iron** |
| | sulfate | $Ag+$ | Al,Zn,Cu |
| | sulfate | $Co^{2+}$ | Zn*,Mn* |
| | chloride | $Sn^{4+}$ | Zn* |
| | chloride | $Pb^{2+}$ | Zn |
| Aliquat 336 | sulfate | $Cu^{2+}$ | Zn,Al,Cd |
| | chloride | $Cu^{2+}$ | Zn,Al,Cd |
| | sulfate | $Ni^{2+}$ | Zn*,iron** |
| | cyanide | $Au^{3+}$ | Zn |
| LIX 622 | chloride | $Cu^{2+}$ | Zn |
| LIX 864 | chloride | $Cu^{2+}$ | Zn,iron** |

*Nitrogen must be present
**iron was low carbon steel or electrolytic iron
***For definitions see TABLE I.

EXAMPLE 2

This example illustrates that the galvanic stripping can be carried out in two stages to achieve 100% iron stripping and removal. An organic liquid loaded with 1.0 g/L iron was mixed with zinc granules for 30 minutes under nitrogen. Metallic zinc was then removed, and the resulting organic phase was stripped with 10 g/L sulfuric acid for five minutes. Analysis showed that complete reduction and stripping of iron was achieved.

EXAMPLE 3

To examine the effects of reoxidation of the ferrous iron, the nitrogen was removed from above the organic and aqueous strip solutions obtained in Example 2. The two phases were allowed to mix in a vessel open to the air. After 30 minutes, it was found that 20% of the stripped iron was re-extracted back into the organic phase.

EXAMPLE 4

A number of tests were done to determine the effect of using nitrogen, an open or a closed reaction vessel, and a one-step or two-step galvanic stripping. Nitrogen was either used or not used; when used, nitrogen was bubbled through the liquid phases, or introduced over the liquid surface. The organic loading was 5 g/L Fe, the ratio of aqueous to organic phase was 1:1, the strip solution was 100 g/L $H_2SO_4$, the temperature was ambient and nitrogen (when used) was admitted for 10 minutes. The percentage of iron stripped was determined. The test conditions and results are given in Table III.

TABLE III

| Test No. | Nitrogen Used | Vessel Used | Zn Metal Used | Steps No. | Fe Stripped % |
|---|---|---|---|---|---|
| 1 | none | closed | none | 1 | 15 |
| 2 | none | open | yes | 2 | 38 |
| 3 | bubbled | closed | yes | 2 | 63 |
| 4 | bubbled | closed | yes | 1 | 79 |
| 5 | over | closed | yes | 1 | 80 |

It can be seen from the results that mere acid stripping removed only 15% of the iron from the organic phase, that the presence of nitrogen is necessary, and that galvanic stripping in one step appears to give better results.

In the following Examples 5 to 7, a leach solution containing ferric sulfate and zinc sulfate was mixed with a solvent consisting of 20 volume percent D2EHPA dissolved in kerosene. The extraction was done in stages with the pH controlled at a value of 2.6 to prevent the precipitation of iron or zinc hydroxides. The volumes of leach solution and solvent were equal. The organic phase was loaded to metal concentrations of 1 to 7 g/L iron and 0 to 13 g/L zinc. After settling, the loaded organic phase was separated from the aqueous raffinate phase and subjected to galvanic stripping.

The galvanic stripping was carried out in one step with the addition of 99.8% pure zinc granules having particle sizes of 1000 to 2000 microns and a total surface area in the range between 15 and 35 cm². The galvanic stripping was carried out at temperatures between 20° C. and 60° C. with the addition of from 2 to 7 g of zinc granules which is in excess of the amount stoichiometrically required for the reduction of the ferric present to ferrous, and in a solution containing from 20 to 100 g/L sulfuric acid.

The loaded organic phase was heated to the desired temperature, sparged with nitrogen for five minutes and zinc and preheated sulfuric acid solution were added. The mixture was then agitated in a closed vessel for 30 minutes. The desired number of samples were taken and analyzed.

EXAMPLE 5

Using the procedure described above, eight tests were done to determine the percentage of iron stripped into the aqueous phase. The values of the variables and the results are shown in Table IV.

TABLE IV

| Test No. | $H_2SO_4$ g/L | Total Zn Area cm² | Temp °C. | Fe (ionic) Loading g/L | $Zn^{2+}$ Loading g/L | Fe Stripped % |
|---|---|---|---|---|---|---|
| 1 | 60 | 15 | 60 | 1 | 0 | 99 |
| 2 | 60 | 35 | 60 | 5 | 8 | 100 |
| 3 | 60 | 35 | 20 | 1 | 0 | 86 |
| 4 | 20 | 15 | 60 | 5 | 0 | 46 |
| 5 | 20 | 35 | 60 | 1 | 8 | 100 |
| 6 | 60 | 15 | 20 | 5 | 8 | 32 |
| 7 | 20 | 35 | 20 | 5 | 0 | 84 |
| 8 | 20 | 15 | 20 | 1 | 8 | 68 |

The results indicate that the galvanic stripping of iron is strongly dependent on the surface area of the added zinc metal and the temperature and, to a lesser degree, on the iron loading.

EXAMPLE 6

Using the procedure described above, eight tests were done to determine the percentage iron stripped with varying zinc loadings, temperatures and zinc metal areas while maintaining the iron loading constant at 1.1 g/L. The values of the variables and percentage iron stripped are given in Table V.

TABLE V

| Test No. | Zn Loading g/L | Total Zn Area cm² | Temperature °C. | Fe Stripped % |
|---|---|---|---|---|
| 1 | 13 | 15 | 30 | 61 |
| 2 | 0 | 35 | 50 | 100 |
| 3 | 13 | 35 | 30 | 88 |
| 4 | 0 | 15 | 30 | 74 |
| 5 | 13 | 15 | 50 | 93 |
| 6 | 0 | 35 | 30 | 96 |
| 7 | 13 | 35 | 50 | 100 |
| 8 | 0 | 15 | 50 | 100 |

The results show that for a given iron loading, increasing the zinc metal surface area resulted in increased amounts of iron stripped. By comparing the results given in Tables IV and V, it can be seen that the effect of temperature remains but that the effect of higher zinc metal area decreased in the presence of higher zinc loading in the organic. The effect of higher zinc loadings is more pronounced at the lower temperature.

EXAMPLE 7

This example illustrates the effects on the percentage of iron stripped and the iron stripping rate of the iron loading of the loaded organic and the surface area of the added zinc metal. Four tests were carried out using the procedure described above. Samples were taken after 5, 10, 15, 20 and 30 minutes and the iron stripped and stripping rates determined. The results are given in Table VI.

TABLE VI

| Test No. | Fe Loading g/L | Total Zn Surface cm² | Time min. | Fe Stripped % | Stripping Rate g/L / min. |
|---|---|---|---|---|---|
| 1 | 1.1 | 15 | 5 | 13 | 538 |
|   |   |   | 10 | 30 | 806 |
|   |   |   | 15 | 46 | 699 |
|   |   |   | 20 | 59 | 538 |
|   |   |   | 30 | 74 | 323 |
| 2 | 1.2 | 35 | 5 | 42 | 323 |
|   |   |   | 10 | 70 | 806 |
|   |   |   | 15 | 78 | 806 |

TABLE VI-continued

| Test No. | Fe Loading g/L | Total Zn Surface cm$^2$ | Time min. | Fe Stripped % | Stripping Rate g/L / min. |
|---|---|---|---|---|---|
|   |     |    | 20 | 83 | 860 |
|   |     |    | 30 | 96 | 538 |
| 3 | 6.8 | 15 | 5  | 7  | 2096 |
|   |     |    | 10 | 15 | 2258 |
|   |     |    | 15 | 25 | 2527 |
|   |     |    | 20 | 34 | 2419 |
|   |     |    | 30 | 46 | 1667 |
| 4 | 6.7 | 35 | 5  | 13 | 3441 |
|   |     |    | 10 | 28 | 3925 |
|   |     |    | 15 | 37 | 3763 |
|   |     |    | 20 | 50 | 3495 |
|   |     |    | 30 | 84 | 4570 |

It follows from the data presented in Table VI that for a given iron loading, increasing the zinc metal surface area resulted in an increase of the amount of iron stripped. At low initial iron loading and high zinc area, a decline in removal rate occurs with increasing time. The stripping rate is increased virtually proportionally with increasing zinc surface area.

EXAMPLE 8

This example illustrates that iron can be effectively removed in a one-step galvanic stripping from different organic phases using different solid metals added in particulate form. The ratio of organic to aqueous phase was 1:1, and the mixing time was 50 minutes. Test data are presented in Table VII.

TABLE VII

| Organic in vol. % | Fe$^{3+}$ loaded in mg/L | Metal added | H$_2$SO$_4$ in g/L | Iron Removed in mg/L |
|---|---|---|---|---|
| 5 D2EHPA in kerosene | 760 | 2.5 g Zn | 20 | 750 |
| 5 D2EHPA in kerosene | 760 | 3.5 g Fe | 20 | 495 |
| 15 LIX 64N | 485 | None | 10 | 0.4 |
| 15 LIX 64N | 485 | Cu | 10 | 371 |

EXAMPLE 9

This example illustrates that lead can be effectively removed by galvanic stripping. Lead loaded to 1.5 g/L in 5 vol. % D2EHPA in 30 mL of organic phase was contacted with 2.5 g of metallic zinc. Samples were taken from the organic at various times, and the samples were stripped with 80 g/L HCl. The amount of lead removed was determined. Examination of the zinc after the tests with a scanning electron microscope showed that metallic lead had deposited on the zinc surface. Test results are given in Table VIII.

TABLE VIII

| Time in minutes | Pb Removed in mg | in % |
|---|---|---|
| 10 | 514 | 34 |
| 30 | 855 | 57 |
| 60 | 963 | 64 |
| 120 | 1380 | 92 |

EXAMPLE 10

This example illustrates that an organic liquid loaded with indium and iron can be selectively stripped of indium, and the iron remaining in the liquid can then be at least partly stripped of iron using added solid metal to yield a regenerated organic liquid with a reduced iron content. In a countercurrent solvent extraction process, a feed solution containing iron and 0.94 g/L indium, and an organic extractant containing one volume % M2EHPA, three volume % D2EHPA, and two volume % TBP in kerosene were used. A loaded organic phase was obtained that contained 0.89 g/L indium and 0.52 g/L iron. The indium was stripped from the loaded organic liquid with 3N hydrochloric acid. The organic liquid was washed with sodium sulfate solution to remove chloride and found to contain <0.003 g/L indium and 0.51 g/L iron. The washed organic liquid was split in two portions. The first portion was treated with 100 g/L sulfuric acid solution in a 1:1 volume ratio, with 10 g activated zinc dust (0.2% Pb) per liter of organic liquid, at ambient temperature, and with the addition of nitrogen. All iron was removed from the organic liquid after 15 minutes. The second portion was similarly treated with 10 g activated zinc dust (0.2% Pb) per liter of organic liquid but with the addition of 150 g/L return acid (obtained from a zinc electrowinning process) in a ratio of organic to acid solution of 30:1. Substantially all iron had been removed after 30 minutes.

EXAMPLE 11

This example illustrates that iron can be at least partly stripped from an organic phase in a one-step process by continuous circulation of organic phase mixed with stripping solution through a column filled with a solid metal. From a vessel containing a mixture of 6.5 L of an organic phase consisting of 4% EHPA, 2% TBP and 94% Exxsol $_{TM}$ D80 by volume, and 6.5 L of a regenerated raffinate containing sodium sulfate and 60 g/L sulfuric acid, 0.5 L/min of the mixture was continuously circulated through a column containing zinc granules. The column was 2 m high with a diameter of 1.9 cm, and was filled with 860 g zinc (0.2% Pb) granules, the void volume being 0.47 L. The temperature was ambient. During the test, nitrogen was sparged into the vessel. Samples were taken from the vessel and from the column effluent at 15 minute intervals, and the iron concentration in the solvent in the aqueous phases of each sample was determined. The results are given in Table IX.

TABLE IX

| Time in minutes | Iron Concentration in g/L | | | |
|---|---|---|---|---|
|   | solvent continuous | | aqueous continuous | |
|   | vessel | column | vessel | column |
| 0 | 0.76 |  | 0.68 |  |
| 1 |  | 0.52 |  | 0.55 |
| 15 | 0.64 |  | 0.60 |  |
| 16 |  | 0.46 |  | 0.45 |
| 30 | 0.54 |  | 0.52 |  |
| 31 |  | 0.36 |  | 0.40 |
| 45 | 0.43 |  | 0.45 |  |
| 46 |  | 0.27 |  | 0.30 |
| 60 | 0.34 |  | 0.37 |  |
| 61 |  | 0.20 |  | 0.22 |
| 75 | 0.26 |  | 0.29 |  |
| 76 |  | 0.15 |  | 0.17 |

EXAMPLE 12

This example illustrates that four-valent cerium (Ce$^{4+}$) can be effectively galvanically reduced to the two-valent state (Ce$^{3+}$) in solvent extraction and subsequent stripping.

An aqueous nitric acid solution containing 15 g/L Ce$^{4+}$ as ammonium cerium nitrate ( (NH$_4$)$_2$ Ce (NO$_3$)$_6$)

was mixed with 99% tributylphosphate (TBP) in an aqueous to organic volume ratio of 1:1. After 10 minutes, the loaded organic phase was separated from the aqueous phase. The loaded organic phase was then mixed with zinc either as pieces or as powder having particle sizes of 74 to 150 microns in an amount of 1 gram per 10 ml of organic phase and an amount of a dilute acid containing 10 g/L $H_2SO_4$ or $HNO_3$ added either together with the addition of zinc or after the galvanic reduction was completed. The galvanic reduction was carried out for times ranging from 30 seconds to 30 minutes. The reduction and stripping were carried out in a closed vessel under a flow of nitrogen. During the reduction the colour of the solution changes from dark orange to colourless. The Ce concentrations in the solutions were determined with x-ray fluorescence, and additional analyses were made using atomic absorption spectometry. All cerium analyses have been transformed into g/L Ce. A series of tests were made including a comparative non-reductive stripping. The test data and analytical results were as follows.

Test 1: Comparative nonreductive stripping

The loaded organic phase contained 14.8 g/L Ce, and was split in two equal portions. One portion was mixed for 30 minutes with an equal volume of a 10 g/L $HNO_3$ solution. The resulting aqueous solution contained 1.1 g/L Ce, and the stripped organic contained 13.7 g/L Ce for a stripping efficiency of only 8%. The other portion was mixed for 30 minutes with an equal volume of a 10 g/L $H_2SO_4$ solution. The resulting aqueous solution contained 2.5 g/L Ce, and the stripped organic contained 12.3 g/L Ce for a stripping efficiency of 17% into the aqueous phase.

Test 2: One-stage galvanic reduction and separate stripping

The loaded organic phase containing 14.6 g/L Ce was mixed with 3 g zinc powder for 30 minutes. After removal of zinc, the reduced organic phase was split in two equal portions which were stripped of cerium as in Test 1. After the nitric acid strip, the aqueous phase contained 7.0 g/L Ce and the stripped organic phase contained 7.6 g/L Ce for a 48% stripping efficiency. For the sulfuric acid stripping, these figures were, respectively, 11.1 g/L Ce, 3.5 g/L Ce and 76%.

Test 3: Simultaneous one-stage galvanic reduction and stripping

The loaded organic phase containing 14.1 g/L Ce was separated in two equal portions. One portion was mixed for 10 seconds with an equal volume of a 10 g/L $HNO_3$ solution and 1 g Zn powder. The resulting aqueous phase contained 9.4 g/L Ce and the stripped organic phase contained 4.7 g/L Ce for a 62% efficiency. The second portion was treated in the same manner but mixed for 30 minutes. The stripping efficiency was 60%.

Test 4: Simultaneous multi-stage galvanic reduction and stripping

The loaded organic phase containing 14.6 g/L Ce was mixed in a first stage with a volume of a 10 g/L $HNO_3$ solution and zinc pieces with a total surface area of 5.6 cm. Mixing was continued until the solution was colourless. After separation, the aqueous phase was found to contain 12.2 g/L Ce for stripping efficiency of 83%. The separated organic phase was then treated in a second stage under the same condition for twice as long a period. The separated aqueous phase contained 2.05 g/L Ce and the stripped organic phase contained 0.35 g/L Ce for a stripping efficiency of 85%. The cumulative efficiency was 97%.

Test 5: Multistage stripping using simultaneous and separate stages

A first portion of a loaded organic phase containing 14.5 g/L Ce was mixed with an equal volume of a 10 g/L $HNO_3$ solution and zinc pieces with a total surface area of 5.2 $cm^2$ until the solution had turned colourless. After separation, the aqueous phase contained 12.2 g/L Ce, and the organic phase was mixed in a second stripping stage with an equal volume of a 10 g/L $HNO_3$ solution for twice as long but no zinc was present. Separated aqueous phase contained 2.0 g/L Ce and separated twice-stripped organic phase contained 0.3 g/L Ce.

A second portion of the same loaded organic phase was mixed with zinc pieces (6.8 $cm^2$) until colourless. The reduced organic phase was then mixed for 10 minutes with an equal volume of a 10 g/L $HNO_3$ solution. After separation, the aqueous phase contained 12.5 g/L Ce, and the stripped organic phase containing 2.1 g/L Ce was again treated with zinc pieces (4.2 $cm^2$) and subsequently mixed for 10 minutes with an equal volume of a 10 g/L $HNO_3$ solution. After separation the final aqueous phase contained 2.1 g/L Ce and the twice-reduced and stripped organic contained 0.9 g/L Ce. It follows from the results of these tests that Cerium is very difficult to strip with acid solutions in the four valent state, viz. the low stripping efficiencies of Test 1, but that after a reduction of $Ce^{4+}$ to $Ce^{3+}$ with a solid metal reductant (zinc), the stripping with dilute acid is almost quantitative.

It is understood that variations and modifications may be made in the embodiments of the invention without departing from the scope and purview of the claims.

I claim:

1. A method for the extraction of cations of at least one metal from an aqueous solution with an organic liquid capable of extracting cations of said at least one metal from said solution, said aqueous solution containing cations of metals selected from the group consisting of a) cations of a desired metal and b) cations of a desired metal together with cations of at least one secondary metal, cations of said at least one secondary metal being co-extracted from the aqueous solution by the organic liquid, said method comprising the steps of:
   (1) mixing said aqueous solution with said organic liquid for the formation of an aqueous raffinate phase and an organic phase containing cations of said at least one metal;
   (2) separating said aqueous raffinate phase from said organic phase;
   (3) contacting separated organic phase with a solid metal capable of reducing in said organic phase at least a portion of said cations of said at least one metal from a higher state of oxidation into a lower state of oxidation, said solid metal being selected from the group consisting of Zn, Al, Cu, Cd, Mn, Mg, Fe and their alloys to provide organic liquid having a reduced content of said cations of metals;
   (4) removing said organic liquid having a reduced content of said cations of metals from said solid metal; and (5) returning organic liquid having a reduced content of said cations of metals to said mixing of step (1); wherein solid metal is defined as including both solid metals and solid metal alloys.

2. A method as claimed in claim 1, wherein said contacting is carried out at ambient conditions.

3. A method as claimed in claim 1, wherein said contacting is carried out in the absence of oxygen.

4. A method as claimed in claim 1, wherein said contacting is carried out for a time sufficient to reduce at least a portion of said cations into a lower state of oxidation.

5. A method as claimed in claim 1, wherein said contacting is carried out for a time in the range of about 1 to 90 minutes.

6. A method as claimed in claim 1, wherein said contacting is carried out at a temperature in the range of from ambient temperature to about 60° C.

7. A method as claimed in claim 1, wherein said solid metal is in a particulate form having particle sizes in the range of from about 44 to 6000 microns 8. A method as claimed in claim 1, wherein said solid metal is in a particulate form having particle sizes in the range of from about 44 to 600 microns 9. A method as claimed in claim 1, wherein said solid metal is zinc.

10. A method as claimed in claim 1, wherein said cations of metal in a higher state of oxidation comprise cations of a desired metal, and said cations of a desired metal are reduced from said higher state of oxidation to said lower state of oxidation.

11. A method as claimed in claim 10, wherein cations of said desired metal are reduced to said lower state of oxidation and are deposited onto said solid metal, and said solid metal with deposited desired metal is removed from said organic liquid.

12. A method as claimed in claim 10, wherein said desired metal is chosen from the group consisting of copper, silver, gold, cobalt, nickel, tin and lead, cations of said desired metal are reduced to said lower state of oxidation and are deposited onto said solid metal, and said solid metal with deposited desired metal is removed from said organic liquid.

13. A method as claimed in claim 10, wherein cations of said desired metal are reduced to said lower state of oxidation and are deposited onto said solid metal, and said solid metal with deposited desired metal is removed from said organic liquid, cations of said desired metal contained in said organic liquid are extracted from an aqueous cation- and anion-containing solution as cations of a desired metal with an organic liquid capable of extracting cations of said desired metal into said organic liquid and said organic liquid, said anion, cations of said desired metal and said added solid metal are chosen in combinations as follows:

| Organic Liquid | Anion | Desired Metal Cation | Solid Metal |
|---|---|---|---|
| D2EHPA | sulfate | $Cu^{2+}$ | Zn,Cd,iron |
| | sulfate | $Ag^+$ | Zn,Al,Cu |
| | sulfate | $Co^{2+}$ | Zn,Mn |
| | chloride | $Sn^{4+}$ | Zn |
| | chloride | $Pb^{2+}$ | Zn |
| Extractant A | sulfate | $Cu^{2+}$ | Zn,Al,Cd |
| | chloride | $Cu^{2+}$ | Zn,Al,Cd |
| | sulfate | $Ni^{2+}$ | Zn,iron |
| | cyanide | $Au^{3+}$ | Zn |
| Extractant B | chloride | $Cu^{2+}$ | Zn |
| Extractant C | chloride | $Cu^{2+}$ | Zn,iron | wherein D2EHPA is di-2-ethylhexylphosphoric acid, Extractant A is tri-($C_8C_{10}$) methylammonium chloride, Extractant B is a mixture of 5-dodecylsalicylaldoxime with tridecanol, Extractant C is a mixture of 1 vol % 5, 8-diethyl-7-hydroxy-6-dodecanone oxime in 2-hydroxyl-5-nonylbenzophenone oxime and 5-dodecylsalicylaldoxime, and iron denotes low carbon steel or electrolytic iron.

14. A method as claimed in claim 1, wherein said cations of metals comprise cations of a desired metal together with cations of at least one secondary metal, said cations of said secondary metal being in said higher state of oxidation, cations of said desired metal and cations of said at least one secondary metal are extracted into said organic phase, cations of said desired metal are stripped from separated organic phase with a stripping solution capable of stripping cations of said desired metal from separated organic phase prior to said contacting with solid metal while substantially leaving cations of said at least one secondary metal in said organic phase, and cations of said at least one secondary metal are reduced from said higher state of oxidation to said lower state of oxidation in said contacting.

15. A method as claimed in claim 1, wherein said cations of metals comprise cations of a desired metal and cations of at least one secondary metal, said cations of said secondary metal being in said higher state of oxidation, cations of said desired metal and cations of said at least one secondary metal are extracted into said organic phase, cations of said at least one secondary metal are reduced from said higher state of oxidation to said lower state of oxidation in said contacting with solid metal while substantially leaving cations of said desired metal in said organic phase to provide organic liquid having a reduced content of cations of secondary metal and having left cations of desired metal therein, and stripping cations of said desired metal from said organic liquid having a reduced content of cations of said secondary metal with a stripping solution capable of stripping cations of said desired metal from said organic liquid prior to returning liquid having a reduced content of said secondary metal to said mixing of step (1).

16. A method as claimed in claim 14, wherein cations of said secondary metal are reduced to said lower state of oxidation and are deposited onto said solid metal, and said solid metal with deposited secondary metal is removed from said organic liquid.

17. A method as claimed in claim 15, wherein cations of said secondary metal are reduced to said lower state of oxidation and are deposited onto said solid metal, and said solid metal with deposited secondary metal is removed from said organic liquid.

18. A method as claimed in claim 14, wherein said secondary metal is chosen from the group consisting of copper, silver, gold, cobalt, nickel, tin and lead, cations of said secondary metal are reduced to said lower state of oxidation and are deposited onto said solid metal, and said solid metal with said deposited secondary metal is removed from said organic liquid.

19. A method as claimed in claim 15, wherein said secondary metal is chosen from the group consisting of copper, silver, gold, cobalt, nickel, tin and lead, cations of said secondary metal are reduced to said lower state of oxidation and are deposited onto said solid metal, and said solid metal with said deposited secondary metal is removed from said organic liquid.

20. A method as claimed in claim 14, wherein cations of said secondary metal are reduced to said lower state of oxidation and are deposited onto said solid metal, and said solid metal with deposited secondary metal is removed from said organic liquid, cations of said secondary metal contained in said organic liquid are extracted from an aqueous cation and anion-containing solution as cations of a secondary metal with an organic liquid capable of extracting cations of said secondary metal into said organic liquid and said organic liquid, said anion, cations of said secondary metal and said added solid metal are chosen in combinations as follows:

| Organic Liquid | Anion | Secondary Metal Cation | Solid Metal |
| --- | --- | --- | --- |
| D2EHPA | sulfate | $Cu^{2+}$ | Zn,Cd,iron |
|  | sulfate | $Ag^{+}$ | Zn,Al,Cu |
|  | sulfate | $Co^{2+}$ | Zn,Mn |
|  | chloride | $Sn^{4+}$ | Zn |
|  | chloride | $Pb^{2+}$ | Zn |
| Extractant A | sulfate | $Cu^{2+}$ | Zn,Al,Cd |
|  | chloride | $Cu^{2+}$ | Zn,Al,Cd |
|  | sulfate | $Ni^{2+}$ | Zn,iron |
|  | cyanide | $Au^{3+}$ | Zn |
| Extractant B | chloride | $Cu^{2+}$ | Zn |
| Extractant C | chloride | $Cu^{2+}$ | Zn,iron | wherein D2EHPA is di-2-ethylhexylphosphoric acid, Extractant A is tri-($C_8C_{10}$) methylammonium chloride, Extractant B is a mixture of 5-dodecylsalicylaldoxime with tridecanol, Extractant C is a mixture of 1 vol % 5, 8-diethyl-7-hydroxy-6-dodecanone oxime in 2-hydroxyl-5-nonylbenzophenone oxime and 5-dodecylsalicylaldoxime, and iron denotes low carbon steel or electrolytic iron.

21. A method as claimed in claim 15, wherein cations of said secondary metal are reduced to said lower state of oxidation and are deposited onto said solid metal, and said solid metal with deposited secondary metal is removed from said organic liquid, cations of said secondary metal contained in said organic liquid are extracted from an aqueous cation and anion-containing solution as cations of a secondary metal with an organic liquid capable of extracting cations of said secondary metal into said organic liquid and said organic liquid, said anion, cations of said secondary metal and said added solid metal are chosen in combinations as follows:

| Organic Liquid | Anion | Secondary Metal Cation | Solid Metal |
| --- | --- | --- | --- |
| D2EHPA | sulfate | $Cu^{2+}$ | Zn,Cd,iron |
|  | sulfate | $Ag^{+}$ | Zn,Al,Cu |
|  | sulfate | $Co^{2+}$ | Zn,Mn |
|  | chloride | $Sn^{4+}$ | Zn |
|  | chloride | $Pb^{2+}$ | Zn |
| Extractant A | sulfate | $Cu^{2+}$ | Zn,Al,Cd |
|  | chloride | $Cu^{2+}$ | Zn,Al,Cd |
|  | sulfate | $Ni^{2+}$ | Zn,iron |
|  | cyanide | $Au^{3+}$ | Zn |
| Extractant B | chloride | $Cu^{2+}$ | Zn |
| Extractant C | chloride | $Cu^{2+}$ | Zn,iron | wherein D2EHPA is di-2-ethylhexylphosphoric acid, Extractant A is tri-($C_8C_{10}$) methylammonium chloride, Extractant B is a mixture of 5-dodecylsalicylaldoxime with tridecanol, Extractant C is a mixture of 1 vol % 5, 8-diethyl-7-hydroxy-6-dodecanone oxime in 2-hydroxyl-5-nonylbenzophenone oxime and 5-dodecylsalicylaldoxime, and iron denotes low carbon steel or electrolytic iron.

22. A method as claimed in claim 14, wherein said secondary metal is iron, at least a portion of said iron is reduced from the ferric state to the ferrous state, and said solid metal is chosen from the group consisting of Zn, Mn and Mg.

23. A method as claimed in claim 15, wherein said secondary metal is iron, at least a portion of said iron is reduced from the ferric state to the ferrous state, and said solid metal is chosen from the group consisting of Zn, Mn and Mg.

24. A method as claimed in claim 14, wherein said organic liquid is chosen from the group consisting of di-2-ethylhexylphosphoric acid, mono-2-ethylhexylphosphoric acid and mixtures thereof, mono-2 ethylhexyl ester of 2-ethylhexyl phosphonic acid, bis (2, 4, 4-trimethylpentyl) phosphinic acid and a mixture of 2-hydroxy-5-nonylbenzophenone oxime and 1% 5, 8-diethyl-7-hydroxy-6-dodecanone oxime, said secondary metal is iron, said solid metal is zinc in particulate form and having particle sizes in the range of from about 44 to 6000 microns, said contacting is carried out in the presence of nitrogen for a time sufficient to reduce at least a portion of said iron from the ferric state to the ferrous state and at a temperature in the range of from ambient to about 60° C., and iron in the ferrous state contained in said organic phase is stripped from said organic phase with sulfuric acid solution containing sulfuric acid in the range of about 20 to 100 g/L with the formation of organic liquid having a reduced content of iron.

25. A method as claimed in claim 15, wherein said organic liquid is chosen from the group consisting of di-2-ethylhexylphosphoric acid, mono-2-ethylhexylphosphoric acid and mixtures thereof, mono-2 ethylhexyl ester of 2-ethylhexyl phosphonic acid, bis (2, 4, 4-trimethylpentyl) phosphinic acid and a mixture of (2-hydroxy-5-nonylbenzophenone oxime) and 1% 5, 8-diethyl-7-hydroxy-6-dodecanone oxime, said secondary metal is iron, said solid metal is zinc in particulate form and having particle sizes in the range of from about 44 to 6000 microns, said contacting is carried out in the presence of nitrogen for a time sufficient to reduce at least a portion of said iron from the ferric state to the ferrous state and at a temperature in the range of from ambient to about 60° C., and iron in the ferrous state contained in said organic phase is stripped from said organic phase with sulfuric acid solution containing sulfuric acid in the range of about 20 to 100 g/L with the formation of organic liquid having a reduced content of iron.

26. A method as claimed in claim 14, wherein said secondary metal is iron, at least a portion of said iron is reduced from the ferric state to the ferrous state, said solid metal is zinc, iron in the ferrous state contained in said organic phase is stripped from said organic phase with a stripping solution capable of stripping iron in the ferrous state from said organic phase with the formation of organic liquid having a reduced content of iron, and said contacting and said stripping of ferrous iron are carried out simultaneously.

27. A method as claimed in claim 15, wherein said secondary metal is iron, at least a portion of said iron is reduced from the ferric state to the ferrous state, said solid metal is zinc, iron in the ferrous state contained in said organic phase is stripped from said organic phase with a stripping solution capable of stripping iron in the ferrous state from said organic phase with the formation of organic liquid having a reduced content of iron, and said contacting and said stripping of ferrous iron are carried out simultaneously.

28. A method as claimed in claim 14, wherein said desired metal is indium, said organic liquid is chosen from the group consisting of di-2-ethylhexylphosphoric acid, mono-2-ethylhexylphosphoric acid and mixtures thereof, said secondary metal is iron, indium is stripped from said organic phase with dilute hydrochloric acid, said solid metal is activated zinc in particulate form and having particle sizes in the range of from about 44 to 600 microns, said contacting is carried out in the presence of nitrogen for a time sufficient to reduce at least a portion of said iron from the ferric state to the ferrous state and at a temperature in the range of from ambient to about 60° C., iron in the ferrous state in said organic phase is stripped with sulfuric acid solution containing sulfuric acid in the range of about 20 to 100 g/L with the formation of organic liquid having a reduced content of iron; and said contacting and the stripping of ferrous are carried out simultaneously.

29. A method as claimed in claim 10, wherein said desired metal is cerium.

* * * * *